US012624793B2

(12) United States Patent
Hove

(10) Patent No.: US 12,624,793 B2
(45) Date of Patent: May 12, 2026

(54) APPARATUS AND METHOD FOR MOVING VISCOUS FLUID BY PRESSURE

(71) Applicant: DANHYDRA A/S, Herning (DK)

(72) Inventor: Thomas Hove, Herning (DK)

(73) Assignee: DANHYDRA A/S, Herning (DK)

( * ) Notice: Subject to any disclaimer, the term of this patent is extended or adjusted under 35 U.S.C. 154(b) by 0 days.

(21) Appl. No.: 18/314,516

(22) Filed: May 9, 2023

(65) Prior Publication Data

US 2023/0366508 A1 Nov. 16, 2023

(30) Foreign Application Priority Data

May 12, 2022 (DK) ............................ PA 2022 00449

(51) Int. Cl.
*F16N 37/00* (2006.01)
*B65G 53/04* (2006.01)
(Continued)

(52) U.S. Cl.
CPC ............. *F16N 37/00* (2013.01); *B65G 53/04* (2013.01); *B65G 53/16* (2013.01); *B65G 53/50* (2013.01); *B65G 53/52* (2013.01); *B65G 53/60* (2013.01); *F16N 31/00* (2013.01); *B65G 2201/042* (2013.01); *B65G 2812/1658* (2013.01); *F16N 2037/006* (2013.01)

(58) Field of Classification Search
CPC ........ B65G 53/16; B65G 53/52; B65G 53/50; B65G 2201/042; B65G 53/60; B65G 2812/1658; B65G 53/04; F16N 37/00; F16N 2210/14; F01M 11/04
See application file for complete search history.

(56) References Cited

U.S. PATENT DOCUMENTS 5,001,805 A 3/1991 Stouky et al.
5,634,713 A 6/1997 Abe
(Continued)

FOREIGN PATENT DOCUMENTS

CN 108657822 A * 10/2018 ............. B65G 53/58
CN 215325656 U 12/2021
(Continued)

OTHER PUBLICATIONS

Search Report—Patent, Danish Patent and Trademark Office, application No. PA 2022 00449, report completed Sep. 13, 2022, 1 page.
(Continued)

*Primary Examiner* — Atif H Chaudry
(74) *Attorney, Agent, or Firm* — Francis J. Maguire; WARE FRESSOLA MAGUIRE & BARBER LLP

(57) ABSTRACT

An apparatus and a method are shown for removing or moving a viscous fluid such as grease from a first unit such as a bearing e.g. a ball bearing to a second unit via a hose or pipe. The apparatus includes a hose or pipe (7) through which the viscous fluid is pumped during operation from an outlet (11) of the first unit (1) to an inlet (10) of the second unit (2), wherein the apparatus further includes a pump connected to the hose or pipe (7) in such a way that the viscous fluid during operation is moved through the hose or pipe (7), and the hose or pipe (7) includes an inlet (8) for gas such as air, and the flow of gas through the inlet (8) is controlled by a valve (9).

14 Claims, 1 Drawing Sheet

(51) Int. Cl.

| | | |
|---|---|---|
| *B65G 53/16* | (2006.01) | |
| *B65G 53/50* | (2006.01) | |
| *B65G 53/52* | (2006.01) | |
| *B65G 53/60* | (2006.01) | |
| *F16N 31/00* | (2006.01) | |

(56) References Cited

U.S. PATENT DOCUMENTS

| | | |
|---|---|---|
| 6,698,989 B2 | 3/2004 | Snowden |
| 2021/0180615 A1 | 6/2021 | Hove |

FOREIGN PATENT DOCUMENTS

| | | | | |
|---|---|---|---|---|
| DE | 4404882 A1 * | 8/1995 | ............... | B09B 5/00 |
| DK | 180695 B1 | 12/2021 | | |
| GB | 1172575 A | 12/1969 | | |
| JP | H06191640 A * | 7/1994 | | |
| JP | H11-257855 A | 11/1999 | | |
| JP | 2003072946 A * | 3/2003 | | |
| JP | 2018189052 A * | 11/2018 | | |
| JP | 2020-51445 A | 4/2020 | | |
| JP | 2020051445 A * | 4/2020 | | |
| WO | 00/76889 A1 | 12/2000 | | |

OTHER PUBLICATIONS

Machine translation of JP202051445A from EPO with highlighting provided by DK Patent Office examiner, 6 pages.
Bibliographic data, including English abstract for Document CN000215325656U, DEPATISnet, 3 pages.
Machine translation of the description contained in CN108657822A, obtained Aug. 18, 2025 from the EPO, 3 pages.

* cited by examiner

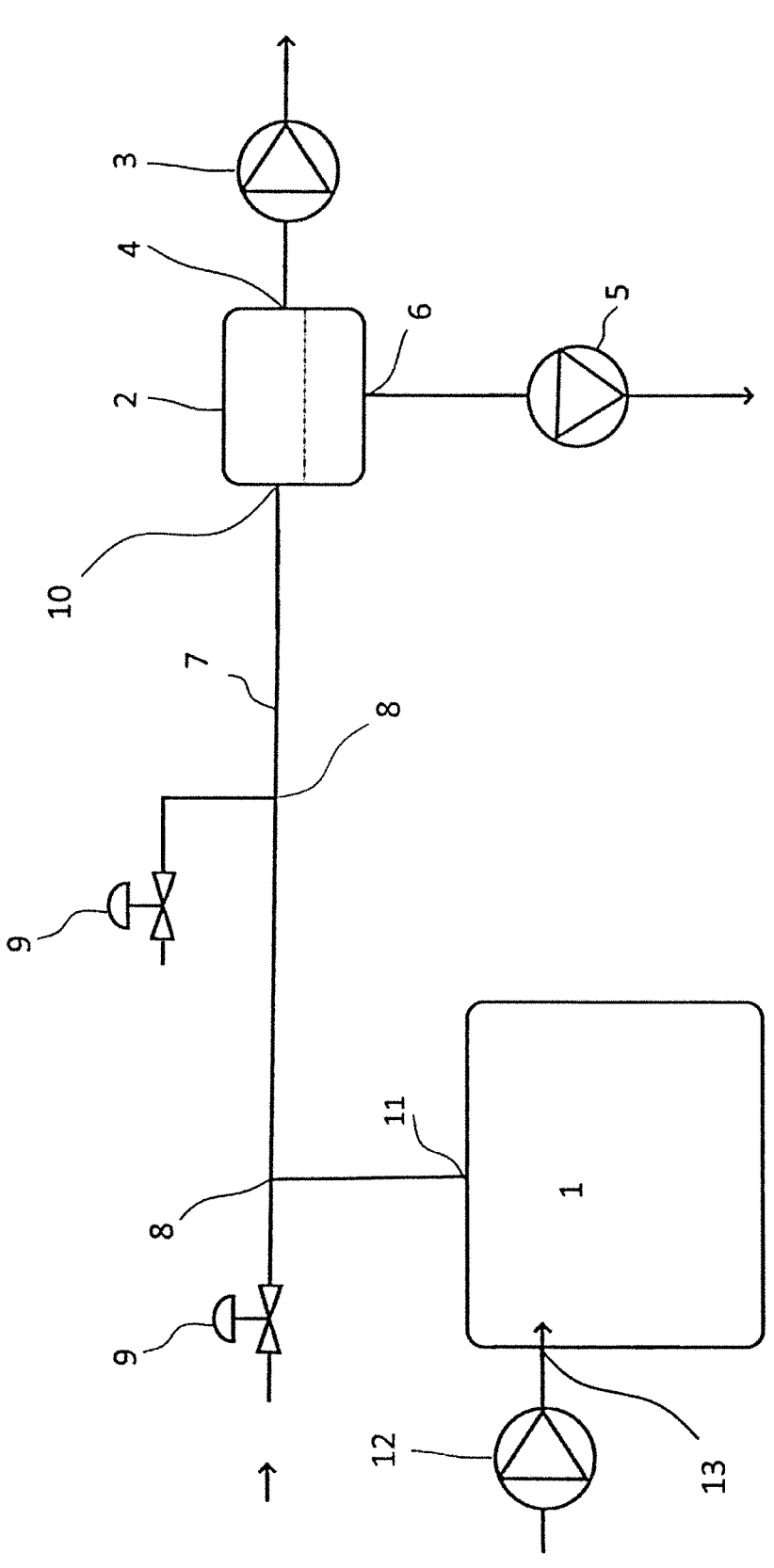

APPARATUS AND METHOD FOR MOVING VISCOUS FLUID BY PRESSURE

BACKGROUND OF THE INVENTION

The present invention relates to an apparatus and a method for removing or moving a viscous fluid such as grease, being a viscous and homogeneous fluid, from a first unit such as a bearing e.g. a ball bearing to a second unit via a hose or pipe.

When removing surplus grease from a bearing or similar space where it is not possible to force the grease out by increased pressure, it has proven to be difficult to remove the grease by suction through a hose or pipe.

U.S. Pat. No. 5,001,805 A discloses an apparatus for pumping a viscous fluid from an outlet (port 29) of a first unit (gear train housing 30) to an inlet of a second unit (waste tank 24) through a hose (5). A vacuum pump (21) is connected to the hose (5) via the second unit (24) and the viscous fluid is moved through the hose (5) by suction. The hose does not comprise an inlet for gas such as air.

DK 180695 B1 discloses an apparatus and a method for removing or moving a viscous fluid such as grease from a first unit such as a bearing to a second unit via a hose or pipe (7). The apparatus comprises a vacuum pump (3) transporting the viscous fluid through the hose or pipe (7), further the hose or pipe (7) comprises an inlet (8) for gas such as air, and the flow of gas through the inlet (8) is controlled by a valve (9).

The object of the present invention is to provide a pumping apparatus which does not stall when pumping the viscous fluid, but instead works effectively and constantly.

SUMMARY OF THE INVENTION

The present invention relates to an apparatus able to pump grease or similar viscous fluids through a hose or pipe. The objective of the present invention is to provide an apparatus which is cheaper and more robust than previously known solutions.

According to a first aspect of the invention, the invention relates to an apparatus comprising a hose or pipe (7) through which a viscous fluid during operation of the apparatus is pumped from an outlet (11) of a first unit (1) to an inlet (10) of a second unit (2), the apparatus further comprises a pump which is connected to the hose or pipe (7) in such a way that the viscous fluid during operation is moved through the hose or pipe (7), and the hose or pipe (7) comprises an inlet (8) for gas such as air, and the flow of gas through the inlet (8) is controlled by a valve (9), wherein the pump (12), which is connected to the hose or pipe (7) in such a way that the viscous fluid during operation is moved through the hose or pipe (7), is a pressure pump i.e. the pump (12) increases pressure in the first unit (1) and thereby forces or pumps the viscous fluid through the hose or pipe (7).

According to any embodiment of the first aspect of the invention, the apparatus may comprise two or more gas inlets (8), optionally the distance between two neighboring gas inlets is at least 0.2 m.

According to any embodiment of the first aspect of the invention, a first gas inlet (8) may be positioned close to the first unit (1), e.g. less than 0.3 m, or less than 0.2 m, or less than 0.15 m from the outlet (11) of the first unit (1), and/or e.g. more than 0.05 m from the outlet (11) of the first unit (1).

According to any embodiment of the first aspect of the invention, a first, or a second or a last gas inlet (8) may be positioned at the hose or pipe (7) in a distance of less than 1 m, or in a distance of less than 0.8 m, from the inlet (10) to the second unit (2)

According to any embodiment of the first aspect of the invention, the valve (9) may be a needle valve or a similar valve capable of fine adjustment.

According to any embodiment of the first aspect of the invention, the second unit (2) may be a separation unit comprising an outlet (6) for viscous fluid through which outlet (6) the viscous fluid is removed by a pump (5) and an outlet (4) for gas.

According to any embodiment of the first aspect of the invention, the first unit (1) may comprise an inlet (13) for pressurized fluid such as gas which gas may be air. Alternatively, the fluid may be more viscous fluid identical to the fluid already present in the first unit (1).

According to any embodiment of the first aspect of the invention, the viscous fluid may be grease or a similar viscous lubricating material.

According to any embodiment of the first aspect of the invention, the opening of the valve (9) may be adjusted when the apparatus is set up, and then the opening of the valve is constant until e.g. manual or automatic re-adjustment takes place.

According to any embodiment of the first aspect of the invention, the hose or pipe (7) is made of a flexible material such as a polymer e.g. PVC, polyurethane, Nomex, polyethylene or thermoplastic, which polymer may be reinforced by fibers or similar.

According to a second aspect of the invention, the invention relates to a method for pumping a viscous fluids from a first unit to a second unit through a hose or pipe, the viscous fluid being transported from an outlet of the first unit to an inlet of the second unit, and a flow of gas is allowed into the hose or pipe at one or more points between the outlet of the first unit and the inlet of the second unit, wherein the transport of viscous fluid from the first unit to the second unit is provided by subjecting the viscous fluid in the first unit to a pressure, thereby forcing the viscous fluid out of the first unit.

According to any embodiment of the second aspect of the invention, the pressure p1 in the first unit may be between 1000 to 1 mbar/760 to 0.75 Torr above atmospheric pressure. At least one specification heading is required. Please delete this heading section if it is not applicable to your application. For more information regarding the headings of the specification, please see MPEP 608.01(a).

BRIEF DESCRIPTION OF THE DRAWING

The sole FIGURE shows a schematic illustration of an apparatus according to the invention.

Throughout the application identical or similar elements of different embodiments are given the same reference numbers.

DETAILED DESCRIPTION

In general—when this expression is used in respect of a feature, the feature may be employed with any embodiment of the invention, even though the specific mentioning appears in the detailed part of the description.

A viscous fluid-Viscosity of a fluid determines to what degree a fluid resists shear deformation, and a viscous fluid provides resistance between the layers of the fluid which will prevent the viscous fluid from flowing quickly towards an outlet thereby increasing the risk of mixing air into the fluid at the outlet during pumping.

Vacuum pump—a pump for exhausting gas from an enclosed space, or a pump forcing fluid from one position to a second position by decreasing the pressure at the second position.

Pressure pump—a pump forcing fluid from one position to a second position by increasing the pressure at the first position.

In general, the invention relates to an apparatus for pumping a viscous fluid from an outlet of a first unit to an inlet of a second unit through a hose or pipe, a pump is connected to the hose or pipe e.g. via the first unit and the viscous fluid is moved through the hose or pipe by pressure.

The sole FIGURE illustrates an embodiment of an apparatus according to the invention comprising a first unit 1 comprising an outlet 11 and a second unit 2 comprising an inlet 10, an outlet 4 for gas and an outlet 6 for viscous fluid.

The apparatus further comprises a hose or pipe 7 providing a connection for viscous fluid between the outlet 11 of the first unit and the inlet 10 of the second unit. The apparatus also comprises a pressure pump 12 forcing the viscous fluid from the first unit 1 to the second unit 2 e.g. by pumping pressurized fluid into the first unit 1 through an inlet 13, thereby transporting the viscous fluid through the hose or pipe 7. The pressurized fluid may be a gas such as air or a viscous fluid similar or identical to the fluid in the first unit 1. Due to the pressure provided by the pump 12, viscous fluid is moved from the first unit 1 through the hose or pipe 7 and into second unit 2 by pressure.

The second unit 2 serves as a separation unit in which gas and viscous fluid are separated. Normally, the viscous fluid flows or falls to the bottom of the second unit 2, and the outlet for viscous fluid 6 may therefore be positioned at the bottom of the second unit. The outlet 4 for gas is normally positioned at the upper half of the second unit. The viscous fluid may be removed through the outlet 6 by positive displacement pump 5 such as a rotary pump or similar and the gas may be removed from the second unit 2 by a vacuum pump 3, the inlet 10 to the second unit may be a simple permanent opening. The outlet 6 for viscous fluid is normally positioned at the bottom of the second unit 2.

The pressure p1 in the first unit is relatively constant and increased relative to atmospheric pressure, the pressure p2 in the second unit is also relatively constant and may be around or below atmospheric pressure, the difference between p1 and p2 may be above or below 800 mbar, or above or below 500 mbar, or above or below 200 mbar.

The hose or pipe 7 comprises an inlet 8 for gas and a valve 9 controls the flow of gas allowed through the inlet 8. The gas is normally air as air is cheap and available, but the gas may alternatively be either a functional gas or a neutral gas such as nitrogen.

The gas inlet 8 is normally positioned relatively close to outlet 11 of viscous fluid from the first unit 1, how close the gas inlet 8 is positioned to the outlet 11 may depend on the diameter of the hose or pipe 7 and of the viscosity of the viscous fluid. In general, the gas inlet 8 is positioned closer to outlet 11 of the first unit (1) than to inlet 10 of the second unit (2). For a hose or pipe 7 having an inner diameter of between 0.5-2 cm, the gas inlet 8 is positioned e.g. less than 0.2 m or less than 0.15 m from the outlet 11 of the first unit 1, and/or e.g. more than 0.05 m from the outlet 11.

The hose or pipe 7 may comprise a plurality of gas inlets 8. This is advantageous if the pipe or hose 7 is long, then the gas plurality of gas inlets 8 may be positioned with a distance d between them of at least 0.20 m, or d≥0.30 m, or d≥0.40 m, or d≥0.50 m.

The valve 9 may e.g. be a needle valve or a similar valve which is capable of fine adjustment.

In general, the first unit 1 may be any unit which may suitably be equipped with an inlet for pressurized gas.

The first unit 1 may be a bearing such as a ball bearing, and the viscous fluid may be grease or a similar lubricating material.

Normally, the opening of the valve 9 is adjusted when the apparatus and the process is set up for operation, and then the opening of the valve is normally constant during operation or e.g. until a manual or automatic re-adjustment takes place due to optimization or adaptation in response to a change of the process or apparatus.

The hose or pipe may be made of a flexible material such as a polymer e.g. PVC, polyurethane, Nomex, polyethylene or thermoplastic, which polymer may be reinforced by fibers or similar. The material of the hose or pipe is adapted to the process where it is to be used, e.g. if the temperature of the viscous fluid is increased the material constituting the hose or pipe should be able to withstand the increased temperature.

The invention also relates to a method for pumping a viscous fluids from a first unit to a second unit via a hose or pipe, the viscous fluid is transported or moved from an outlet of the first unit to an inlet of the second unit through the hose or pipe 7 while subjected to a pressure. A flow of gas is allowed into the hose or pipe through one or more gas inlets positioned between the outlet of the first unit and the inlet of the second unit.

The pump may provide an increased pressure in the first unit between 1 and 900 mbar, e.g. between 1 and 800 mbar, e.g. between 1 and 500 mbar.

| Ref. no. | Ref. name |
|---|---|
| 1 | First unit |
| 2 | Second unit such as a container |
| 3 | Vacuum pump |
| 4 | Gas outlet from second unit |
| 5 | Positive displacement pump such as a rotary pump |
| 6 | Outlet for viscous fluid from second unit |
| 7 | Hose or pipe |
| 8 | Inlet for gas |
| 9 | Valve |
| 10 | Inlet to second unit |
| 11 | Outlet from first unit |
| 12 | Pressure pump |
| 13 | Inlet for pressurized gas |

The invention claimed is:

1. An apparatus comprising one hose or pipe (7) through which grease being a viscous and homogeneous fluid during operation of the apparatus is pumped from an inlet of the hose or pipe (7) to an outlet of the hose or pipe (7), the apparatus comprises a pump (12) and a connection connecting the pump (12) to the inlet of the hose or pipe (7) in such a way that the viscous fluid during operation is moved through the hose or pipe (7) from the inlet of the hose or pipe (7) to the outlet of the hose or pipe (7), which connection does not comprise a one-way valve between the pump (12) and the inlet of the hose or pipe (7), and the hose or pipe (7) comprises an inlet (8) for gas positioned between the inlet of the hose or pipe (7) and the outlet of the hose or pipe (7), gas pressure at the inlet (8) for gas is controlled by a valve (9) and the opening of the valve (9) is adjusted when the apparatus is set up for operation, wherein the pump (12) is a pressure pump (12) connected to the inlet of the hose or pipe (7) in such a way that the viscous fluid during operation is moved through the hose or pipe (7) from the inlet of the hose or pipe (7) to the outlet of the hose or pipe (7), by increasing the pressure at the inlet of the hose or pipe (7) thereby forcing the viscous fluid through the hose or pipe (7), which hose or pipe (7) does not comprise a one-way valve preventing flow of viscous fluid towards the inlet of the hose or pipe (7), at a position between the inlet of the hose or pipe (7) and the inlet (8) for gas, wherein the apparatus further comprises a bearing having an outlet (11) which outlet (11) is connected to the inlet for the hose or pipe (7).

2. The apparatus according to claim 1, wherein the hose or pipe (7) comprises two or more gas inlets (8).

3. The apparatus according to claim 1, wherein a first gas inlet (8) is positioned closer to the inlet of the hose or pipe (7) than to the outlet of the hose or pipe (7).

4. The apparatus according to claim 3, wherein the first gas inlet (8) is positioned less than 0.3 m, or less than 0.2 m, or less than 0.15 m from the inlet of the hose or pipe (7), or more than 0.05 m from the inlet of the hose or pipe (7), or both more than 0.05 m from the inlet of the hose or pipe (7) and less than 0.3 m, or less than 0.2 m, or less than 0.15 m from the inlet of the hose or pipe (7).

5. The apparatus according to claim 1, wherein, a first, or a second or a last gas inlet (8) is positioned at the hose or pipe (7) at a distance of less than 1 m, or in a distance of less than 0.8 m, from an inlet (10) to a second unit (2).

6. The apparatus according to claim 1, wherein the valve (9) is a needle valve capable of adjustment or another type of valve capable of adjustment.

7. The apparatus according to claim 1, wherein the hose or pipe (7) extends between the outlet (11) of the bearing and an inlet (10) of a second unit (2).

8. The apparatus according to claim 7, wherein the second unit (2) is a separation unit comprising an outlet (6) for viscous fluid through which outlet (6) the viscous fluid is removed by a pump (5) and an outlet (4) for gas.

9. The apparatus according to claim 7, wherein the bearing (1) comprises an inlet for pressurized gas.

10. The apparatus according to claim 1, wherein the viscous fluid is grease or another viscous lubricating material.

11. The apparatus according to claim 1, wherein the hose (7) is made of a flexible material.

12. A method for transporting grease being a viscous and homogenous fluid through a hose or pipe (7) comprising at least two inlets, a first inlet for viscous fluid and a second inlet (8) for pressurized gas, and an outlet for viscous fluid and gas, wherein the viscous fluid is pumped into the hose or pipe (7) through the first inlet towards the outlet of the hose or pipe (7), and while pumping, the second inlet (8) is simultaneously subjected to a continuous pressure of pressurized gas during operation.

13. The method according to claim 12, wherein the hose or pipe (7) comprises a third inlet for pressurized gas positioned downstream of the second inlet for pressurized gas and both the second inlet and the third inlet are each subjected to a constant pressure of pressurized gas during operation.

14. The method according to claim 12, wherein a pressure p1 at the inlet of the hose or pipe (7) is between 1000 to 1 mbar/760 to 0.75 Torr above atmospheric pressure.

\* \* \* \* \*